United States Patent [19]

Rembold et al.

[11] 4,226,295
[45] Oct. 7, 1980

[54] GEAR SHIFT SYSTEM AND METHOD WITH OPTIONAL GAS PEDAL CONTROLLED SHAFT INITIATION

[75] Inventors: Helmut Rembold, Möglingen; Ernst Linder, Muhlacker; Ferdinand Grob, Besigheim, all of Fed. Rep. of Germany

[73] Assignee: Robert Bosch GmbH, Stuttgart, Fed. Rep. of Germany

[21] Appl. No.: 883,873

[22] Filed: Mar. 6, 1978

[30] Foreign Application Priority Data

Apr. 1, 1977 [DE] Fed. Rep. of Germany ....... 2714559

[51] Int. Cl.² ............................................... B60K 20/16
[52] U.S. Cl. ...................................... 180/335; 74/866; 180/271; 180/336
[58] Field of Search ............... 180/77 R, 70 R, 103 R, 180/105 E; 74/865, 866, 870, 871, 877, 861, 856

[56] References Cited

U.S. PATENT DOCUMENTS

| | | | |
|---|---|---|---|
| 3,433,101 | 3/1969 | Scholl | 74/866 |
| 3,460,406 | 8/1969 | Strohm | 180/77 R X |

FOREIGN PATENT DOCUMENTS 908942 4/1954 Fed. Rep. of Germany.
1555170 6/1974 Fed. Rep. of Germany.

Primary Examiner—John P. Silverstrim
Attorney, Agent, or Firm—Frishauf, Holtz, Goodman, Woodward

[57] ABSTRACT

Rapid movement of the gas pedal initiates a shifting operation to the next higher or next lower gear depending upon whether the speed of the gearing lies above or below a predetermined speed range. The speed range extends from a first to a second predetermined speed. Both the width of the range and the actual values of the first and second predetermined speed are automatically adjusted as a function of the throttle valve position and the then-present gear. If the gas pedal is not activated but the gear speed is less than a predetermined first threshold speed, an automatic down-shift takes place. Up-shifting can only occur when the speed of the gearing exceeds a minimum up-shift speed. Engagement and disengagement of the clutch is controlled and may include jolt limiting. The engine speed is limited during gear shifting.

52 Claims, 12 Drawing Figures

GEAR SHIFT SYSTEM AND METHOD WITH OPTIONAL GAS PEDAL CONTROLLED SHAFT INITIATION

The present application relates to systems and methods for controlling gear shifts in motor vehicles. In particular, it relates to motor vehicles having gears engageable in a plurality of different gear ratios, wherein the gearing is decoupled from the engine during the gear shift operations.

BACKGROUND AND PRIOR ART

If the gearing in an internal combustion engine is so arranged that the engine can always operate at maximum capacity, a very economical operation results. To accomplish this, either a continuously variable gearing extending over a relatively large range is required or, for gears which are operable in steps, a fifth or sixth gear (a so-called overdrive gear) must be furnished. For a short term view, the overdrive solution is preferrable since continously varying gears have a lower efficiency. While the use of an overdrive gear in cross country driving can decrease the fuel consumption by as much as 15%, it does require much additional shifting. While planetary gearing as is generally utilized in the known systems with overdrive gears, is much easier to shift and allows the shifting to take place without output power interruption, it is also much more expensive than the normal spur gear system. Even the change from a three gear planetary gearing to a four gear planetary gearing results in much increased expense. Therefore a number of gear control systems have been developed which are semiautomatic, utilized spur gear trains and tolerate the output power interruption.

A number of systems are known in which the shifting was made easier for the driver by allowing the clutch to be operated with the gear shift lever. In these systems touching of the gear shift lever activated an electrical contact which in turn activated a clutch control system. In other systems, the shifting process itself releases the clutch control. The disadvantage of these systems is that all gears must be activated manually which is a great inconvenience to the driver especially when a fifth and sixth gear are provided.

Fully automatic gear shift systems for spur gear trains with power interruption are also known. In U.S. Pat. No. 3,433,101 an electrical control of the automatic gear shifting in a motor vehicle is shown in which the release of the clutch causes the gears to be shifted in a sequence depending upon the vehicle speed. After the correct gear ratio has been set, the clutch is automatically reengaged. In this system a generator furnishes an output voltage which varies as a function of vehicle speed. The output voltage is applied to a plurality of threshold stages, each having a different threshold, each being connected to a solenoid valve which, when energized, causes a corresponding gear to be engaged. The disadvantage of this arrangement is that the gear shift is completely pre-programmed and no gear shift at all can take place under the driver's control. Further, a hydraulic apparatus must be furnished to operate the throttle valve during the gear shift, since otherwise the speed of the engine would become excessive while the gears are being shifted.

Another system is disclosed in DT-PS No. 908,942, which utilizes an auxiliary gear train. The auxiliary gear train comprises planetary gearing which is controlled by a control signal which in turn depends upon the speed with which the gas pedal is activated by the driver. However, this system does not constitute an automatic gear control system since only the addition of an auxiliary gear is controlled and the actual operating conditions of the motor vehicle such as the vehicle speed, the throttle position, etc. are not taken into consideration at all.

In DT-PS No. 1,555,170, a system is described in which a so-called "kick down" command is derived from the speed with which the gas pedal is activated. However, only a shift-down command can be initiated by this system. It is thus unsuitable for use of overall control of an automatic gear shift system.

U.S. application Ser. No. 407,975, filed Nov. 11, 1964, describes an arrangement similar to that disclosed in DTP 1,555,170 wherein the down-shift command is derived when the speed with which the pedal is activated exceeds a predetermined threshold speed. This arrangement is not suitable for the reasons given above insofar as the control of an automatic gear shift apparatus is concerned.

THE INVENTION

It is an advantage of the present invention that the gear shift can be operated under driver control by a sudden movement of the gas pedal. The motor vehicle can therefore be operated both according to the drivers preference and in accordance with the then-present traffic conditions. Since the driver has the foot on the gas pedal in any case, no additional burden results in activating the gear shift with the same foot.

Briefly, in accordance with the invention, an upshift command signal is applied to the gear shift means when the gearing speed exceeds a first gear speed and the amplitude of the first derivative with respective time of a signal corresponding to the gas pedal position exceeds a first predetermined value. A down-shift command signal is applied to the gear shift means when the speed of the gearing is less than a predetermined second gear speed and the amplitude of the first derivative with respect to time of a signal signifying the gas pedal position exceeds a second predetermined value.

In a preferred embodiment the furnishing of said up-shift signal is impeded when the speed of the gearing is less than a predetermined minimum up-shift speed.

For power transmission from the engine through the gearing to the driven part of the motor vehicle, coupling means (a clutch) is utilized and suitable clutch control means is provided. A clutch control means may comprise a jolt control stage which limits the jolt to the motor vehicle when the motor vehicle is first starting and during the gear shifting to below a predetermined allowable jolt.

In a further preferred embodiment a free run switch is provided which, when activated, allows the clutch to be disengaged if the throttle valve position or the position of the gas pedal is equal to or less than a predetermined minimum position.

The gear shifting is carried out, in one embodiment, by releasing the gas pedal. The decoupling of the engine from the output then causes no difficulty.

Drawings, illustrating preferred embodiments

The method and system of the present invention will be described in connection with a motor vehicle which has a driver operated mode selector having a park, reverse, neutral and drive position. When starting the motor vehicle, the driver switches from the park through the neutral to the drive position. This is to result in automatic engagement of the first gear. As long as the gas pedal is either fully released or depressed less than a predetermined amount, the clutch remains disengaged. If the gas pedal is activated, the clutch is engaged in a controlled fashion.

A gear shift is carried out whenever a sudden movement of the gas pedal occurs, if such sudden movement occurs when the gear speed is such that either an up-shift or a down-shift is permissible. The criterion for the speed conditions is established by determining whether the actual gear speed is above or below a predetermined gear speed range. Both the width of the range and its position can be varied as a function of the position of the throttle valve and as a function of the then-engaged gear. If the actual gear speed is above the range, an up-shift is allowed; if it is below the range, a down-shift is possible. If rapid activation of the gas pedal then indicates a desired gear shift, either the up-shift or down-shift command as appropriate, is stored and the clutch is disengaged. After the clutch is disengaged, the gear shift is carried out, the stored command is erased and the clutch is re-engaged in a controlled manner.

If the driver allows the vehicle to roll while the gas pedal is released or is depressed less than a predetermined amount, an automatic down-shift occurs when the predetermined minimum speed in the then-engaged gear is passed.

In order to effect a fuel savings, the driver may disengage the clutch when the gas pedal is released by pushing a free run button.

Excessively early up-shifting is prevented by requiring that the speed of the gearing exceeds a predetermined minimum up-shift speed before the up-shift command can be carried out.

Figure 1:
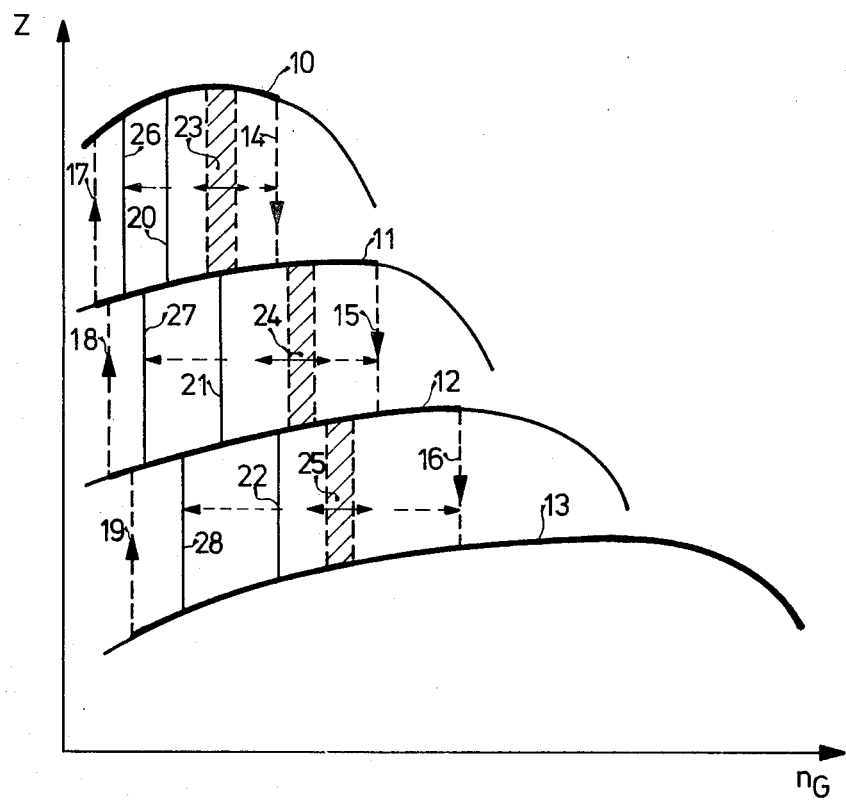
FIG. 1 shows curves of tractive power as a function of output gear speed for a motor vehicle having a four gear drive.

In FIG. 1 the tractive power as a function of gear speed for a motor vehicle having a four gear drive is shown. In first gear, the speed range is denoted by reference numeral 10, in second gear by reference numeral 11, in third by reference numeral 12 and in fourth gear by reference numeral 13. The top speed for first, second and third gear, respectively, is denoted by reference numerals 14, 15 and 16. The top speed is the maximum allowable speed at which the engine is designed to operate in each of the gears. A predetermined first threshold speed, 17, 18, 19, marks the lower end of ranges 10, 11, and 12 respectively. The predetermined first threshold speed is the speed below which an automatic shifting into the next lower gear takes place. Specifically, an automatic shifting from fourth gear to third gear will take place when the vehicle speed is less than that denoted by reference numeral 19, from third to second gear when the speed is decreased below that denoted by reference numeral 18 and from second to first gear when the speed is less than that denoted by reference numeral 17. A predetermined minimum up-shift speed, that is a predetermined minimum speed required from an up-shifting from first to second gear is denoted by reference numeral 20. Similar minimum up-shift speeds for second and third gear are denoted by reference numerals 21 and 22 respectively. No up-shift can be carried out if the speed of the gearing does not exceed these minimum up-shift speeds when in the respective gears.

To determine whether the proper conditions for shifting exist, predetermined gear speed ranges (23, 24, 25) are defined. The ranges 23, 24, and 25 can be moved throughout regions limited respectively by a lower boundary speed 26, 27, 28 and at the upper end by the top speeds 14, 15 and 16. The starting up of the vehicle would then take place in the following fashion. First, the vehicle is accelerated along curve 10 until it reaches the top speed 14, at which point it is shifted into second gear. It then proceeds in the direction of the arrow along curve 11 until the top speed of second gear, 15, is reached. At this point an up-shift to third gear takes place and, again, the vehicle operates along curve 12 until top speed 16 is reached. If the pedal is now released, the system operates along curve 13 in the direction of the arrow until it reaches the predetermined first threshold speed 19. The speed is then decreased along curve 12 until speed 18 is reached where the shift from third to second gear takes place. The vehicle then operates in second gear along curve 11 until speed 17 is reached at which point it is switched into first gear. Besides this automatic control, which takes place along predetermined boundary values, up-shift and down-shift can also be carried out under driver control.

Figure 2:
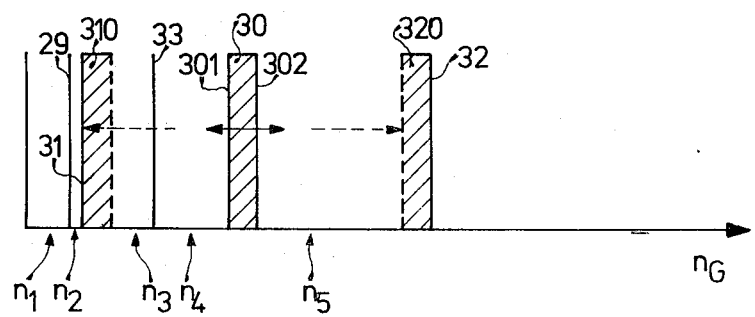
FIG. 2 shows the various switching speeds for one of the gears as a function of gear speed.

FIG. 2 shows the critical speeds and threshold values for a particular gear. The overall speed region of the gear is limited at the lower end by the predetermined first threshold speed, 29. A predetermined gear speed range 30 is limited at the upper end by a predetermined first gear speed 302 and at the lower end by a predetermined second gear speed 301. The predetermined gear speed range 30 can be moved between a lowest possible position 310 and a highest possible position 320. The lowest possible position 310 of the predetermined gear speed range 30 is limited to a speed 31 which is slightly higher than speed 29. Similarly, the highest possible position of the predetermined gear speed range, (320) is limited in that its upper speed 32 is determined by the maximum allowable engine speed. Further, a minimum up-shift speed 33 is required before an up-shift can actually take place.

If the predetermined gear speed range 30 is in the lowest possible position 310, and the actual speed is speed $n_1$ an automatic down-shift occurs since speed $n_1$ is less than the predetermined first threshold speed 29 and, as will be explained below, the gas pedal is released when the predetermined gear speed range 30 is in the lowest possible position 310.

When the actual speed of the gearing is $n_2$, a down-shift can occur, since speed $n_2$ is less than speed 310. A down-shift can therefore be initiated under the drivers control by rapid movement of the gas pedal. An up-shift cannot occur at speed $n_3$, since $n_3$ is less than the minimum up-shift speed 33, although it does exceed the predetermined first gear speed marking the higher end of region 310. Only when the speed exceeds the minimum up-shift speed, for example at a speed $n_4$, can the gearing be up-shifted. If it is now assumed that the predetermined gear speed range 30 occupies the middle position shown in FIG. 2, then the gearing could be shifted down at speeds $n_2$, $n_3$, and $n_4$, since these three speeds are all less than the predetermined second gear speed 301. However, the gearing can only be up-shifted at a speed $n_5$, which lies above the predetermined gear speed range 30.

As mentioned above and explained in more detail below, the desired shift signal which is derived from the movement of the gas pedal is stored and the stored value is utilized for carrying out the actual gear shift. This is because the position of the actual speed relative to the predetermined gear speed range 30 changes during the gear shifting. For example, if the actual speed is $n_4$ and the predetermined gear speed range 30 is in the lowest possible position 310, and, therefore, an up-shift occurs, the furnishing of the shift command and movement of the gas pedal to the lowest possible pedal position will cause the range 30, as will be explained below, to move to a position higher than speed $n_4$. For example, the speed range may be in the position indicated by reference numeral 320. This, however, would cause a down-shift command to be initiated. This would result in equipment malfunction if the up-shift command had not previously been stored.

Figure 3:
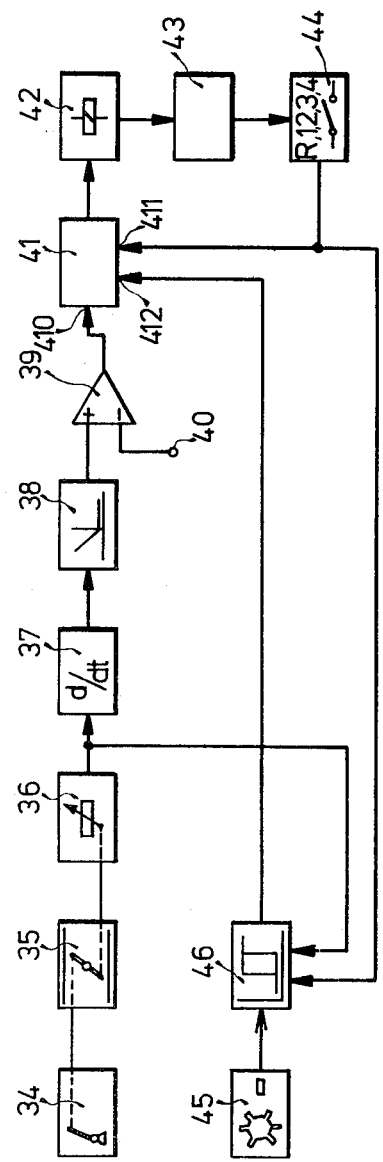
FIG. 3 is a block diagram of one embodiment of the present invention.

In FIG. 3 the gas pedal 34 is coupled to the throttle valve 35 of a internal combustion engine. A throttle position sensor 36 is coupled to throttle valve 35 and furnishes a throttle position signal, that is an electrical signal whose amplitude corresponds to the throttle position. A differentiator stage 37 is connected to the output of throttle position sensor 36. A stage 38 furnishes a magnitude signal having an amplitude corresponding to the amplitude of the differentiator output signal, independent of its sign. The output of stage 38 is connected to the direct input of a comparator 39 whose inverting input is connected to at terminal 40. A first reference signal is applied at terminal 40. The output of comparator 39 is connected to a terminal 410 of a gear control stage 41. Gear control stage 41 applies its output signals to gear shift activators 42 which comprise the servo control and solenoid valves which activate the gears. The actual gearing 43 is connected to a set of contacts 44, each of which, when closed, signify that the shift to the corresponding gear has been completed. Contacts 44 furnish the signals salled engaged or present gear signals herein. Contacts 44 are connected to an input 411 of gear control stage 41. A gear speed sensor 45 furnishes a transmission speed signal corresponding to the gear speed. These sensors are well known and may be optical sensors, or as shown, may comprise a toothed disc rotating at the output gear speed and cooperating with an inductive signal generator. The gear speed sensor 45 is connected through a hysteresis stage 46 to a still further input 412 of gear control stage 41. Hysteresis stage 46 has two control inputs, the first being connected to the output of the throttle position sensor 36, the second being connected to the contacts 44.

Gear control stage 41 furnishes shift command signals such as "shift-down from third gear into second gear". These signals are applied to the servo system of stage 42 which contains the solenoid valves which actually operate gearing 43. To generate them it must first be known which gear is presently engaged. For this purpose input 411 is connected to contacts 44. It also must be determined whether a shift-up or a shift-down process is to be initiated. For this determination, input 412 is connected to the output of hysteresis stage 46. If the actual gear speed is above the predetermined speed range an up-shift operation is enabled, while if it is below a down-shift operation is enabled. All the information for enabling a shift in a particular direction from the then-engaged gear is thus available. The actual shifting will take place upon receipt of the desired gear signal, namely the signal generated by the driver by rapid activation of the gas pedal. This signal, as mentioned previously, is applied to terminal 410.

The rapid movement of the pedal, in the embodiment of the invention shown in the drawing, is derived from the throttle valve position signal, since the throttle valve is mechanically coupled to the gas pedal. In order to determine whether a sufficiently rapid movement of gas pedal 34 took place, the throttle position signal is differentiated in stage 37 and the resulting value is compared to a minimum value which is applied as a reference signal at terminal 40 of comparator 39. Stage 38 is interposed between differentiator 37 and comparator 39 so that the absolute magnitude of the differentiated signal rather than its sign will determine whether or not the threshold of comparator 39 is passed. For this purpose stage 38 would comprise a direct connection between stage 37 and the direct input of comparator 39 as well as an inverter connected in parallel with the direct connection. If, however, it is desired to differentiate the desired shift signal from a signal resulting from rapid depression of the gas pedal in order to cause an acceleration, stage 38 would contain a circuit for shunting the positive differentiator output to reference potential. Such a circuit, in a preferred embodiment, is a resistor diode combination connected between the output of stage 37 and reference potential, with the input of stage 39 connected to the common point of resistor and diode.

Both the position and the width of the hysteresis curve generated by stage 46 can be influenced by the throttle position signal and the then-engaged gear. In a preferred embodiment of the invention, the lower most position 310 and the highest possible position 320 of the predetermined gear speed range are determined in dependence on the signals furnished by contacts 44. Specifically, the lowermost position would result from signals signifying lowest gears, while the upper most position would result from signals signifying that highest gears are engaged. Within these extreme positions, the actual position is determined by the throttle position signal.

The width of the predetermined gear speed range, that is the width of range 30 or the difference between the predetermined first and second gear speed varies as a function of which gear is then engaged, that is as a function of the signals derived from contacts 44. In a preferred embodiment the width is small for the lower gears and wide for the higher gears. Specific values are: For first gear Predetermined first gear speed 70–110 rmp
Predetermined second gear speed 90–130 rpm; corresponding values for second, third and fourth gear are:
second: 120–180 rpm; 150–210 rpm.
third: 190–290 rpm; 230–330 rpm.

Figure 4:
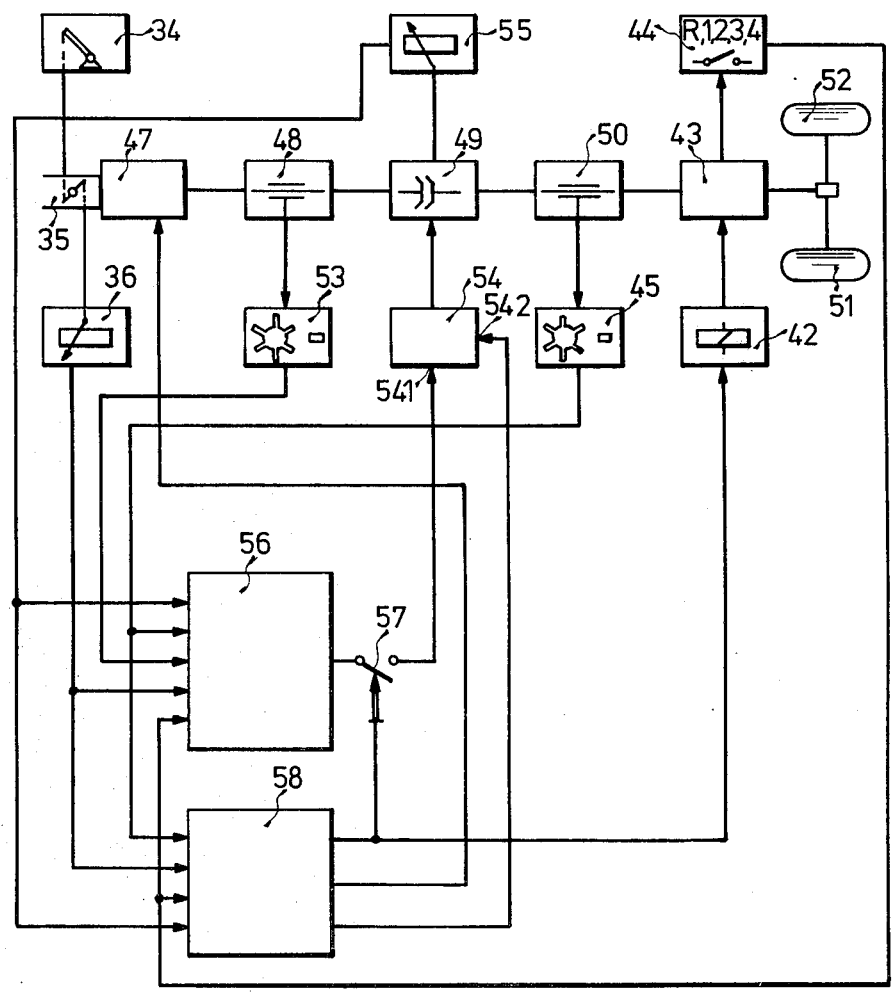
FIG. 4 is a block diagram of an embodiment of the present invention as connected in a motor vehicle.
Figure 5:
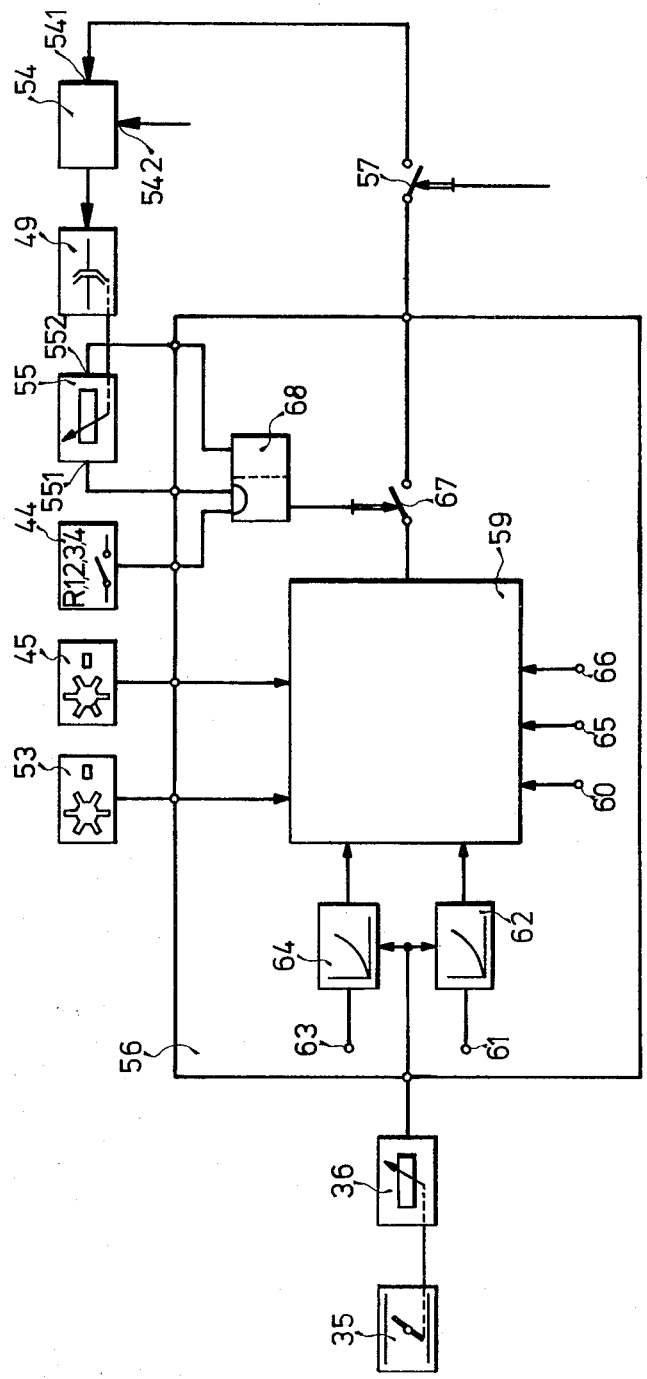
FIG. 5 is a block diagram of the coupling control means shown in FIG. 4.

In FIG. 4 the present invention is shown as incorporated in a motor vehicle. Engine 47 has an engine shaft 48 which, through a clutch 49, can be engaged and disengaged from a gear shaft 50 which is part of gearing 43. Gearing 43 drives wheels 51 and 52. Engine 47 has a throttle valve 35 which is coupled to gas pedal 34 and whose position is sensed by throttle position sensor 36. The speed of shaft 48 is sensed by an engine speed sensor 53 which furnishes an electrical signal corresponding to the rotary speed of the shaft. Clutch 49, herein referred to as coupling means, is activated by a coupling activator 54 which has a control input 541 and a disengage input 542. A signal applied at input 542 causes the clutch to be disengaged. A coupling position sensor 55 furnishes a signal signifying the degree to which the clutch is engaged. This coupling position signal is applied to a coupling control stage 56 which in turn is connected to input 541 of coupling activator stage 54 through a switch 57. Further inputs to the coupling control stage 56 are the engine speed signal form stage 53, the throttle position signal from stage 36, the transmission speed signal from gear speed sensing stage 45 and the signals from contacts 44 which signify which gear is engaged. A more detailed diagram of coupling control stage 56 is shown in FIG. 5 and will be described below. Also shown in FIG. 4 is a gear control stage 58. Gear control stage 48 contains all the circuitry for furnishing both the shift enable signals and the desired shift signal in response to the inputs which include the coupling position signal, the throttle position signal, the engine speed signal and the transmission speed signal. The gear control output is applied to stage 42 and is also applied to switch 57 for controlling the open/closed state thereof. This connection insures that the ccupling and gearing controls will operate in proper synchronism. Gear control stage 58 is also connected to engine 47 for the purposes of limiting its speed when clutch 49 is disengaged. The last output of stage 58 is connected to input 542 of coupling activator 54. A signal at this output causes the clutch to be disengaged. Gear control stage 58 is shown in greater detail in FIG. 6.

Referring now to FIG. 5, the throttle valve is again indicated as stage 35, the throttle position sensor as stage 36. The various other sensors and activators all have the same reference numerals as in the previous figures. It should be noted that coupling position sensor 55 furnishes a signal at a terminal 551 which signifies that the clutch is completely disengaged and a signal at a terminal 552 signifying that the clutch is fully engaged. Also as in FIG. 4, the output of stage 56 is connected through a first switch, 57, to input 541 of coupling activator stage 54.

Coupling control stage 56 comprises a jolt control stage 59 which, in a preferred embodiment is the system described in U.S. patent application Ser. No. 867,307 filed Jan. 6, 1978, Rembold et al. The operation of this jolt limiting stage is as follows: at first the clutch is engaged linearly until the gear speed reaches a speed $n_{GO}$. In the second phase the clutch engagement takes place as a function of the difference between the actual jolt, $R_a$, experienced by the vehicle and a predetermined, maximum allowable jolt $R_O$ and the rate of change of engine speed, $n_M$. A third phase commences when the difference between the engine speed and the gear speed is less than a predetermined difference $\Delta n$. This causes a further control voltage to be superimposed which causes the variation with respect to time of the engine and the gear speeds to approach each other at an angle which does not exceed a predetermined angle $B_s$. Further, the control characteristic is so arranged that the clutch engagement is finished when the speed reaches a predetermined speed $n_K$. Furthermore, it is taken into consideration whether an up-shift or a down-shift process is to be carried out; i.e. the difference in sign between the engine speed and the input speed of the gearing is taken into consideration.

Jolt regulator stage 59 operates solely with inputs corresponding to engine speed $n_M$ and the gear speed $n_G$. While the coupling is being engaged, the engine speed $n_M$ will first increase while the gear speed $n_G$ is zero since the gearing is completely decoupled from the engine. As soon as power is transferred from the driving to the driven side, the gear speed $n_G$ will increase. Since the stage is to operate solely as a function of engine speed $n_M$ and gear speed $n_G$, the actual jolt to the vehicle must be determined by finding the second derivative of the input gear speed $n_G$. This however can only be accomplished when speed $n_G$ exceeds a predetermined threshold value $n_{GO}$. Until the speed of the gearing reaches this threshold speed, no jolt regulation can take place. A signal corresponding to the threshold speed $n_{GO}$ is applied at terminal 60. In the second phase the coupling activator is controlled by a signal which results from the comparison of jolt $R_a$ to the maximum allowable jolt $R_o$ and application of the difference to stage 59. The predetermined value for the maximum allowable jolt $R_o$ is furnished to stage 59 via a terminal 61 after modification by stage 62. Stage 62 causes a variation of the value $R_o$ as a function of the throttle position, as illustrated in the curve showing $R_o$ vs. throttle position in box 62 of FIG. 5. As is readily apparent to one skilled in the art, such a curve can be implemented by use of, for example, a potentiometer having a corresponding resistance variation. The value of the maximum allowable jolt $R_o$ is thus adjusted in accordance with the individual driver's habits. It is also possible to use different values of $R_o$ for different gear ratios, change $R_o$ with changes in load on the vehicle, etc. To prevent the clutch engagement from being ended at an excessively high gear speed, the output signal of stage 59 is also modified by the difference between the engine speed $n_M$ and a predetermined speed $n_K$. The predetermined speed $n_K$ is applied at a terminal 63 and is modified by a stage 64 in accordance with the throttle position signal, as illustrated by the curve $n_K$ vs. throttle position in box 64 of FIG. 5. Again, the implementation of such a curve is apparent to one skilled in the art. During the second phase of clutch engagement, stage 59 controls the engagement as a function of the difference between the actual and the maximum permissible jolt values. This phase continues until the difference between engine speed $n_M$ and transmission speed $n_G$ is less than a predetermined difference $\Delta n$. The value of $\Delta n$ is supplied at a terminal 65. In the third control phase, the control is carried in such a manner that the variations with respect to time of engine speed $n_M$ and transmission speed $n_G$ meet at an angle which is less than the predetermined maximum allowable angle $B_s$. If, at any-time, the angle which the time variations of engine and transmission speed form to each other is greater than $B_s$, the coupling activator 54 is controlled in such a manner that this angle is decreased. The clutch is finally fully engaged at an angle less than the angle $B_s$, the maximum engine speed being limited to the speed $n_K$. The predetermined maximum allowable value of $B_s$ is applied to stage 59 at a terminal 66.

The output signal of jolt regulator 59 is connected to the output of coupling control stage 56 through a switch 67 whose open/closed state is determined by a signal received from a first flip-flop 68. Flip-flop 68 is set, thereby closing switch 67, in the simultaneous presence of a signal at terminal 551 signifying a disengaged clutch and a signal from one of the contacts 44, signifying that a gear is engaged. The reset input of flip-flop 68 is connected to terminal 552 of coupling position sensor 55, that is flip-flop 68 is reset when the coupling (clutch) is fully engaged. Thus a signal can be applied to input 541 of coupling activator 54 only when a gear is engaged and, simultaneously, clutch 49 is completely disengaged. After the controlled engagement of the clutch, the second end contact 552 furnishes a signal resetting flip-flop 68. This causes switch 67 to open and disconnect terminal 541 from the output of the jolt control stage.

Figure 6:
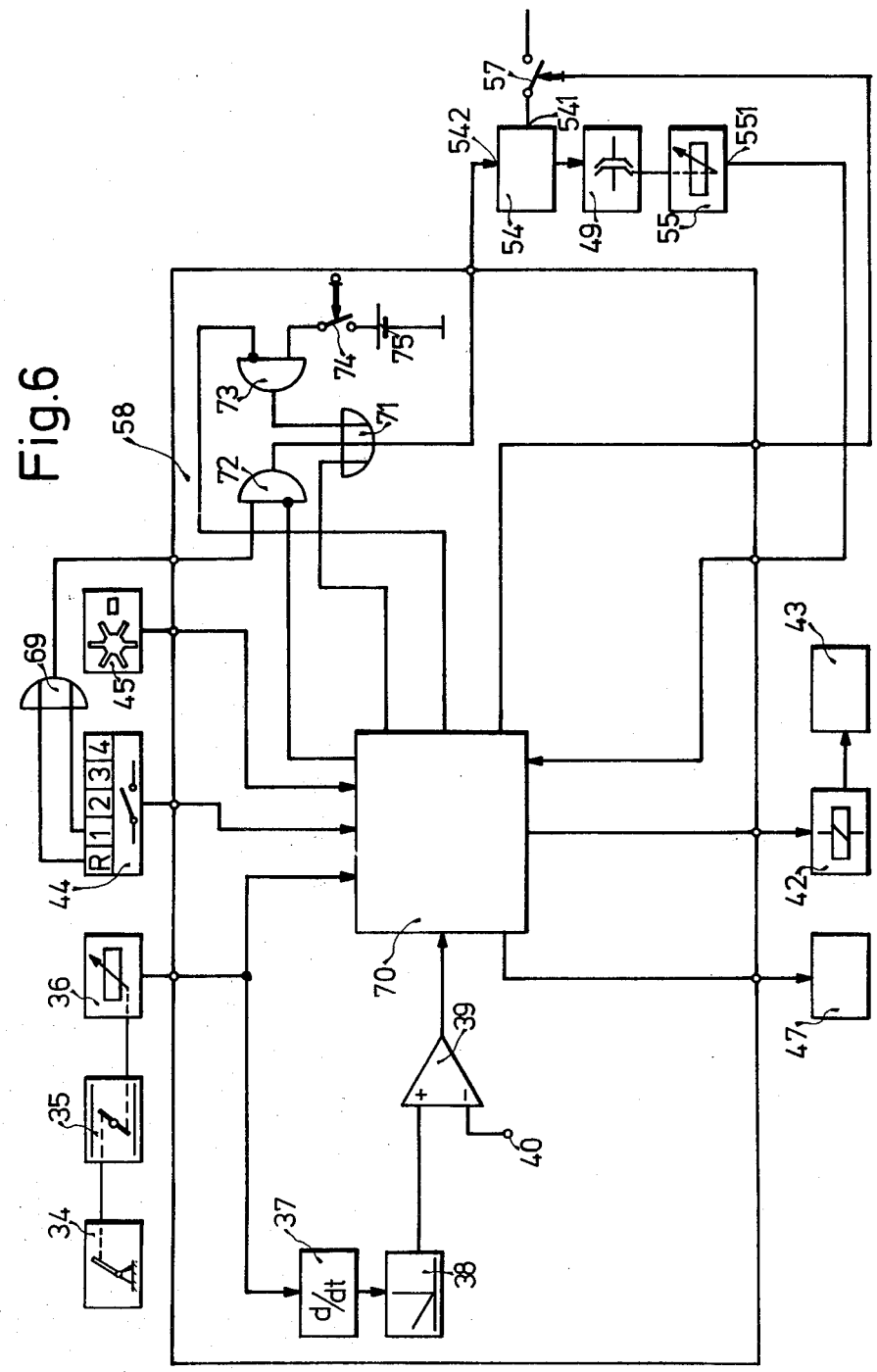
FIG. 6 is a block diagram of one embodiment of the gear control means shown in FIG. 4.
Figure 7:
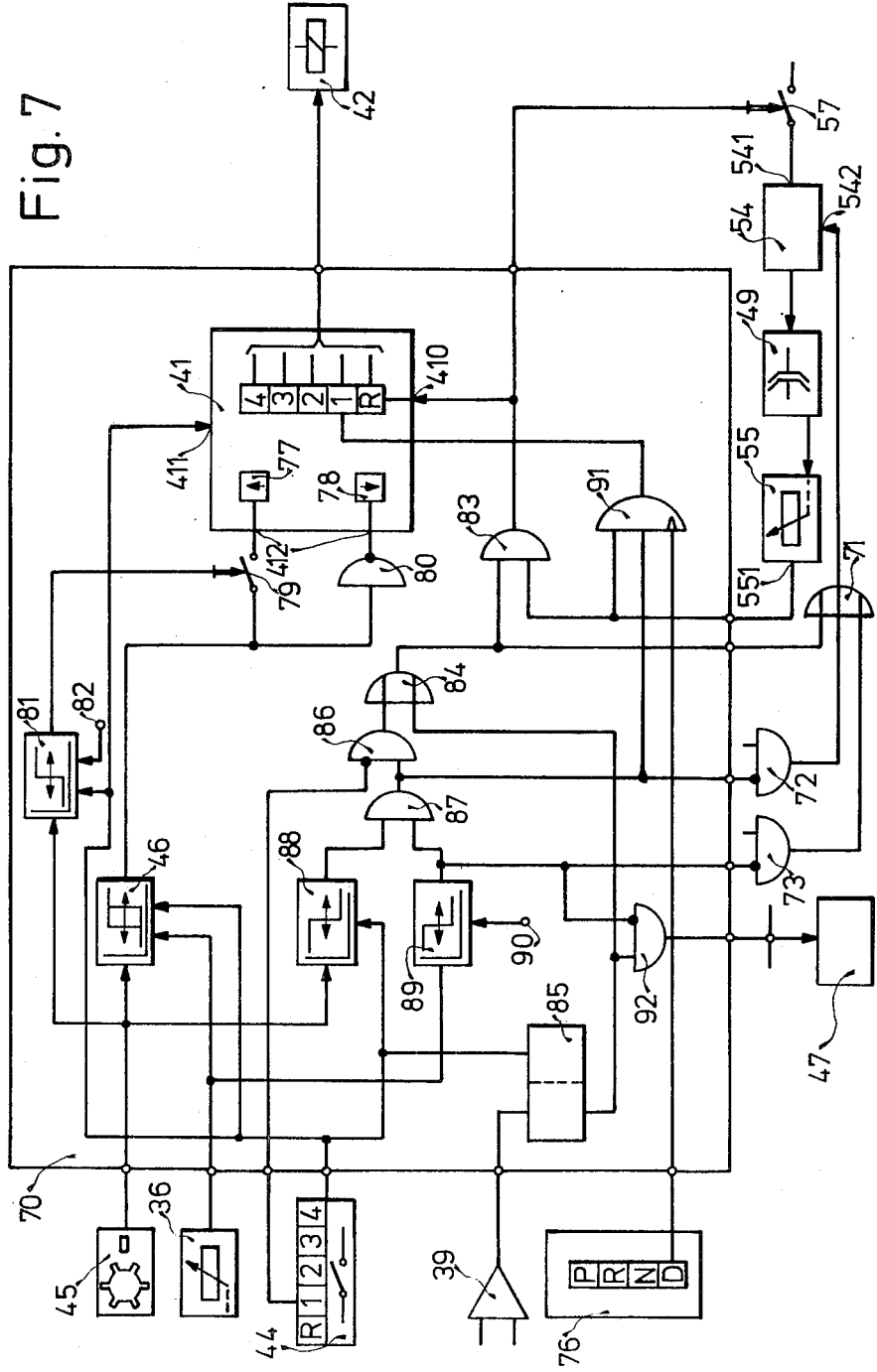
FIG. 7 is a more detailed diagram of the switching logic stage of FIG. 6.

FIG. 6 shows a gear control stage. Input signals to the gear control stage are derived from the throttle position sensor 36, the gear contacts 44 and transmission speed sensor 45. Further, the gear contacts signifying reverse and first gear are connected to the inputs of an OR gate 69 whose output is also applied to stage 58. A further input is derived from coupling position sensor 55. The output signals from gear control stage 58 are applied to disengage input 542 of coupling activator 54, first switch 57, gear activator 42 and engine 47. A switching logic stage 70 processes the input signals as well as the desired shift signal supplied by comparator 39. The stage is shown in FIG. 7 and will be described in detail below. The signal applied to engine 47 causes the speed of the engine to be limited so that it will no exceed a maximum allowable speed during the shifting and while clutch 49 is disengaged. Gear activator stage 42 receives a shift command signal which specifies from which gear to which gear the shift is to take place. Further, switch 57 is controlled in such a way that the coupling control stage 56 is connected to the stage 54 which engages the clutch after the gear shift has been completed.

Gear control stage 58 further comprises circuits for disengaging clutch 49. The disengagement signal is furnished by an OR gate 71 which has three inputs. The first input of second OR gate 71 is connected to stage 70 and receives a "1" signal when the transmission speed is less than a predetermined first threshold speed, 17, 18, 19, 29 and, simultaneously, the gas pedal is released. Second input of OR gate 71 is connected to the output of a first AND gate 72. The first input of AND gate 72 is connected to the output of OR gate 69. The second, inverting input of AND gate 72 is connected to the output of stage 70. This means that a disengage signal is furnished to coupling control stage 54 when either the first or the reverse gear is engaged and, simultaneously, the gas pedal is released and the transmission speed is less than the predetermined first threshold speed. The third criterion for disengaging coupling 49 is furnished by second AND gate 73 whose output is connected to the third input of OR gate 71. The first inverting input of AND gate 73 receives a positive control signal from stage 70 when, as shown in FIG. 7 gas pedal 34 is released. The second input of AND gate 73 receives a signal from a battery 75 when free run switch 74 is closed. Switch 74 is driver operated. Thus the coupling can be disengaged thereby saving fuel if free run switch 74 is activated while gas pedal 34 is released.

FIG. 7 shows a more detailed diagram of the switching logic 70 of FIG. 6. Inputs to this stage are the gear speed sensor stage 45, the throttle position sensor 36, the set of contacts 44 each of which signifies that a particular gear is engaged, comparator 39, the driver operated mode selector 76 and the coupling position sensor 55. Outputs of the stage comprise the gear activator 42, the first switch 57, the second OR gate 71, first AND gate 72, second AND gate 73, and the internal combustion engine 47.

The output signals to gear actuator 42 are furnished by the gear control stage 41 which furnishes shift command signals indicative of the particular gear from which and to which the shift is to occur. The desired shift signal is furnished at an input 410. The signal signifying which gear is presently engaged is received at an input 411, the shift-up signal at an input 412. The shift-down signal is derived from the shift-up signal by an inverter 80. The shift-up signal is received at a terminal 77, the shift-down signal at a terminal 78. The gear speed sensor 45 is connected to the hysteresis stage 46. A logic "1" signal is present at the output of hysteresis stage 46 when the transmission speed is above the hysteresis range, and a "0" signal when the transmission speed is below the hysteresis region (23, 24, 25, 30). The output of hysteresis stage 46 is connected to the shift-up input 77 and through inverter 80 to the shift-down input 78 of stage 41. The hysteresis range, as previously mentioned, is limited on the lower end by the predetermined second gear speed and on the upper end by the predetermined first gear speed. Both speeds can be changed as a function of the then-present gear and as a function of the throttle position. If third switch 79 is closed, a positive output signal at the output of stage 46 is applied to the shift-up input 77 of stage 41. This constitutes the shift-up enable signal. A logic "0" signal at the output of hysteresis stage 46 is inverted by inverter 80 and furnishes a "1" signal at the shift-down input 78. This constitutes the down-shift enable signal. Third switch 79 is controlled by the output of the first threshold stage 81 whose input is connected to the gear speed sensor 45. The threshold to which stage 81 is set can be varied by a signal applied at a terminal 82 or can be changed as a function of the then-engaged gear by means of contacts 44. First threshold stage 81 determines the predetermined minimum up-shift speed, that is the speed in each gear which must be achieved before an up-shift can take place, regardless of the then-present hysteresis range. Thus switch 79 remains open as long as the transmission speed is less than the minimum up-shift speed as determined by threshold stage 81.

Input 410 of stage 41 is connected to the output of third AND gate 83. The first input of third AND gate 83 is connected to terminal 551 of the coupling position sensor 55. The second input of third AND gate 83 is connected through third OR gate 84 to the output of a second flip-flop 85. The set input of flip-flop 85 is controlled by comparator 39. Comparator 39 furnishes a "1" signal when the rate of change with respect to time of the throttle position exceeds a predetermined value, that is when the driver indicates by an abrupt movement of the gas pedal that a gear shift is to take place. A desired shift signal will thus be applied to input 410 if the clutch 49 is disengaged, that is if there is a signal at terminal 551, simultaneously with receipt of a comparator output signal. Setting of flip-flop 85 thus initiates a gear shift operation if an up-shift or a down-shift enable signal is also present. The output signal of flip-flop 85 is applied to one input of OR gate 84 whose output is applied to the second input of an AND gate 83. The output of OR gate 84 is also applied to the first input of a second OR gate 71 whose outputs is applied to the disengage control input 542 of the coupling control stage 54. Clutch 49 is therefore released until, finally, the terminal 551 of coupling position sensor 55 receives a signal. This causes the first input of AND gate 83 to receive a signal thereby in turn causing the desired shift signal to be applied at terminal 410. The desired shift signal is also applied to switch 57 and causes switch 57 to close. A controlled reengagement of the clutch can then take place after the shifting process has been completed. The reset input of flip-flop 85 is connected to contacts 44. Thus, when the gear shift has been completed, the second flip-flop 85 is reset causing its output to switch to a "0".

The second input of OR gate 84 is connected to the output of a fourth AND gate 86. The first input of AND gate 86 is connected to the output of a fifth AND gate 87. The inputs of AND gate 87 are connected to the output of a second threshold stage 88 and a third threshold stage 89, respectively. The input of second threshold stage 88 is connected to the gear speed sensor 45. A control input to threshold stage 88 is connected to contacts 44 so that the threshold value is changed as a function of the engaged gear. The third threshold stage 89 furnishes an output when the gas pedal 34 is released. In the simplest case, the threshold value of threshold stage 89 is set to zero; that is, it is simply determined whether the throttle valve or gas pedal 34 is activated at all. Of course, it is also possible to furnish a slighty different threshold by applying a signal at a control input 90 so that threshold stage 89 furnishes an output signal if the throttle position signal indicates the throttle position less than the value set at terminal 90. AND gate 87 will thus furnish an output when the gear speed is less than the predetermined first threshold speed, that is less than the speed at which an automatic down-shift is to occur, and gas pedal 34 is also released. A down-shift is to take place under these conditions. This takes place as described above by activation of the clutch, and a resultant "1" output at AND gate 83. Since under these conditions a down-shift enable signal is present at terminal 78, the signal applied at terminal 410 will cause the down-shift operation to occur. A fourth AND gate 86 is connected between the output of AND gate 87 and the input of OR gate 84. The second input of AND gate 86 is an inverting input and is connected to the one of contacts 44 which signify an engaged first gear. AND gate 86 prevents the output signal from AND gate 87 from being applied to the input of OR gate 84 when the equipment is in first gear.

A sixth AND gate 91 has an output directly connected to that input of stage 41 which causes a direct shift to first gear. A first input of AND gate 91 is connected to terminal 551 of coupling position sensor 55, the second input is connected to the output, of AND gate 87 and the third input which is a differentiating input, is connected to the contact associated with the D (drive) position of the mode selector 76. When the vehicle is standing still and gas pedal 34 is released, clutch 49 is disengaged since AND gate 72 furnishes an output and this output is applied through OR gate 71 to the disengage input 542 of coupling control stage 54. When clutch 49 is disengaged, a control signal exists at the first input of AND gate 91, and a second "1" input is furnished by the output of AND gate 87. If now the driver operates the mode selector from the neutral position to the drive position, a "1" signal will appear at the third input of AND gate 91 causing gear control stage 41 to furnish a signal to the gear activator 42 which causes the latter to activate the first gear.

The output of third threshold stage 89 is connected to the inverting input of a seventh AND gate 92 whose second input is connected to the output of flip-flop 85. The output of AND gate 92 is applied to a speed limiter which is part of engine 47. The speed limiter prevents the engine speed from increasing excessively during the gear shift. This would happen when the output of flip-flop 85 were set by comparator 39 and the throttle valve position exceeds that set at terminal 90. Therefore the output of threshold stage 89 is connected to an inverting input of AND gate 92. The output of AND gate 92 is thus a "1" signal when flip-flop 85 is set and no signal appears at the output of threshold stage 89.

Figure 8:
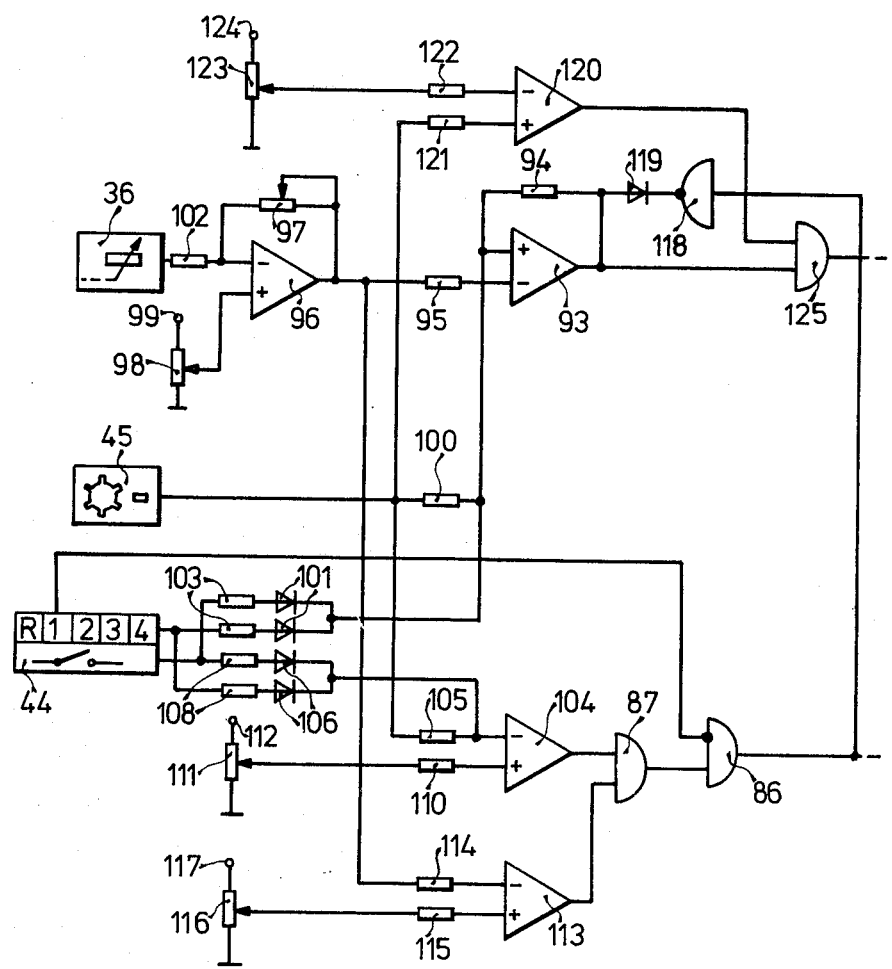
FIG. 8 is a more detailed diagram of a first embodiment of a hysteresis and threshold stages shown in FIG. 7.

FIG. 8 is a more detailed diagram of those parts of FIG. 7 which determine the inputs to stage 41. Hysteresis stage 46 is shown as a first operational amplifier 93 which has a positive feedback resistor 94. The inverting input of operational amplifier 93 is connected through a resistor 95 to the output of a second operational amplifier 96. An adjustable negative feedback resistor 97 is connected from the output of operational amplifier 96 to its inverting input. The inverting input of operational amplifier 96 is connected through a resistor 102 to throttle position sensor 46. The direct input of operational amplifier 96 is connected to the tap of a variable resistor 98 which in turn is connected between reference potential which may be chassis and a terminal 99 to which a reference voltage is applied. The direct input of operational amplifier 93 is connected through a resistor 100 to gear speed sensor 45. It is also connected through a pair of series circuits including diodes 101 and resistors 103 to contacts 44. Second threshold stage 88 is embodied in a second comparator 104 whose inverting input is connected through a resistor 105 to gear speed sensor 45 and directly through two series circuits including diodes 106 and resistors 108 to contacts 44. The direct input of comparator 104 is connected through a resistor 110 to the tap of a variable resistor 111 which is connected between reference potential and a terminal 112 to which a reference voltage is applied.

Threshold stage 89 is embodied in a third comparator 113 whose inverting input is connected through a resistor 114 to the output of operational amplifier 96 and whose direct input is connected through a resistor 115 to the tap of a variable resistor 116. Resistor 116 is connected between reference potential and a terminal 117. The outputs of comparators 104 and 113 are connected, respectively, to the inputs of fifth AND gate 87 whose output is connected to the input of AND gate 86. The output of AND gate 86 is connected through an inverter 118 and a diode 19 to the output of operational amplifier 93.

Threshold stage 81 is embodied in a fourth comparator 120 whose direct input is connected through a resistor 121 to gear speed sensor 45 and whose inverting input is connected through a resistor 122 to the tap of a variable resistor 123. Resistor 123 is connected between a terminal 124 and reference potential.

Operational amplifier 93, to create the hysteresis curve, is designed as a Schmitt trigger. It therefore has a positive feedback resistor 94. As a first input, operational amplifier 93 receives the transmission speed signal at its direct input. The changing of the hysteresis curve in dependence of the then-engaged gear is carried out by means of the series circuits consisting of diodes 101, 102 and resistors 103, 104 which are connected to contact 44. With these two series circuits, different values can be obtained for the four gears. For example, in the first gear no voltage may be applied to either of the two series circuits, in the second gear one of the series circuits may receive a voltage, in third gear the other, and in fourth gear both. The voltage created across the series circuits is added to the input voltage at the direct input of operational amplifier 93. The throttle position signal is applied to the inverting input of operational amplifier 93 through resistor 95. The throttle position signal is first processed in operational amplifier 96. Operational amplifier 96 acts as an amplifier whose gain may be varied by adjustment of resistor 97. The output voltage of amplifier 96 for a zero input at the inverting input may be adjusted by adjustment of resistor 98 which causes a fraction of the voltage applied at terminal 99 to be applied to the direct input of operational amplifier 96. A "1" signal thus appears at the output of operational amplifier 93 when the voltage furnished by gear speed sensor 45 signifies a speed above the hysteresis region as set by operational amplifier 93 and a "0" signal when the transmission speed signal is a voltage less than the minimum voltage fixed by the hysteresis region of operational amplifier 93. The hysteresis region is continuously variable as a function of the throttle position signal and is varied in steps by gear contacts 44. Comparator 104 is used to determine whether the gear speed is less than the first threshold speed. The inverting input of comparator 104 is connected to gear speed sensor 45. The voltage at is inverting input which corresponds to the sum of the voltage appearing across the series circuits of diodes 106 and resistors 108 and the transmission speed signal, is compared to the voltage at the direct input, namely the voltage derived from resistor 111. Similarly, comparator 113 determines whether the gas pedal has been released that is whether the throttle valve position is less than the predetermined value which is derived from resistor 116. A normalized voltage corresponding to the throttle valve position is derived from the output of operational amplifier 96 and applied to the inverting input of comparator 113 through resistor 114.

AND gate 87 will furnish a "1" signal when the gear speed $n_G$ is below the first threshold speed 17, 18, 19, 29 and the throttle valve position is below the minimum value. Under these conditions it is desirable to force the output of Schmitt trigger 93 to the "0" condition. This is accomplished by inverter 118 and diode 119. The "0" signal at the output of inverter 118 causes the output of Schmitt trigger 93 to be connected to the potential constituting a "0" signal.

Comparator 120 furnishes a "1" signal when the gear speed exceeds the minimum shift-up speed (20, 21, 22, 33). The transmission speed signal is applied to the positive input of comparator 120. The inverting input is connected, as mentioned above, through resistor 122 to resistor 123. Further, the inverting input is connected through a pair of series circuits including diodes and resistors to contacts 44. A pair of series circuits is indicated by reference numeral 109 in FIG. 8 and is similar to diodes 101 and resistors 103. The output of comparator 120 is thus a "1" signal when the transmission speed signal is indicative of a gear speed exceeding the minimum up-shift speed in the then present gear.

Switch 79 is embodied in eighth AND gate 125 whose output is connected to up-shift input 77 of gear control stage 41. If the gear speed $n_G$ is above the thresholds 20, 21, 22 and 33, AND gate 125 receives a "1" signal from comparator 120. A positive signal at the output of operational amplifier 93 causes a "1" signal to appear at the output of AND gate 125. This causes the up-shift enable input of stage 41 to be activated. A "0" signal at the output of operational amplifier 93, which constitutes a down-shift enable signal, causes a "0" signal to appear at the output of AND gate 125. A signal is thus always transmitted through AND gate 125 from operational amplifier 93 when comparator 120 furnishes a "1" signal. However when the gear speed is below the minimum up-shift speed, the furnishing of the up-shift enable signal to stage 41 is to be interrupted. Therefore the output of AND gate 125 is a "0" output whenever the output of comparator 120 is a "0", regardless of the signal furnished by operational amplifier 93.

Figure 9:
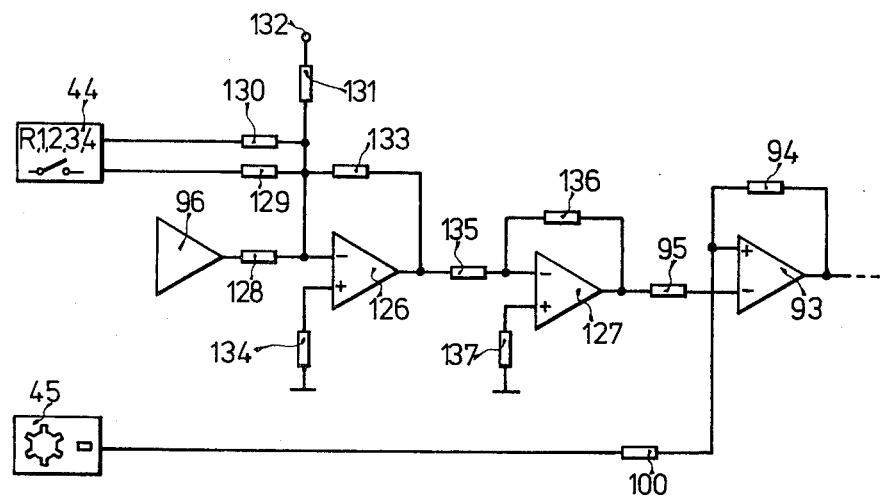
FIG. 9 is a more detailed diagram of a second embodiment of the stages and hysteresis stage shown in FIG. 7.

FIG. 9 shows a preferred embodiment of a hysteresis stage 46 whose characteristic curve varies as a function of throttle position and of the then-present gear. The output of second operational amplifier 96 is applied to the inverting input of operational amplifier 93 through a third operational amplifier 126 and a fourth operational amplifier 127. Specifically, the output of operational amplifier 96 is connected through a resistor 128 to the inverting input of operational amplifier 126. It is further connected through a resistor 129 and a resistor 130 to contacts 44. Additionally it is connected through a resistor 131 to a terminal 132. The third operational amplifier 126 has a negative feedback resistor 133. The direct input of operational amplifier 126 is connected to the reference or chassis potential through a resistor 134. The output of third operational amplifier 126 is connected through a resistor 135 to the inverting input of operational amplifier 127. Operational amplifier 127 has a negative feedback resistor 136. Its direct input is connected to reference potential through a resistor 137. As mentioned above, the output of operational amplifier 96 is a normalized voltage corresponding to the throttle valve position. This voltage is applied through operational amplifier 126 and 127 to operational amplifier 93 which forms the hysteresis characteristic. The signal corresponding to the then-engaged gear is applied to the inverting input of operational amplifier 126. The two resistors together allow differentiation between four different conditions as did the diode resistor combinations in FIG. 8. Again, in first gear no voltage may be applied from contacts 44 to resistors 129 and 130. In second gear both resistors might receive a voltage, and in third gear one of the resistors and in fourth gear the other. These resistors in combination with resistor 131 therefore allow four different voltages to be applied to the inverting input of operational amplifier 126, namely a different voltage for each gears 1, 2, 3 and 4. The hysteresis characteristic therefore can be moved in steps in dependence on which gear is engaged. Operational amplifier 127 serves as an inverter to remove the undesired inversion caused by operational amplifier 126.

Figure 10:
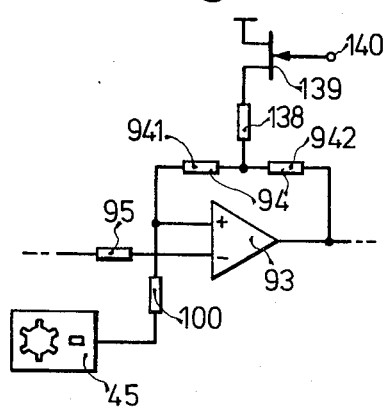
FIG. 10 is a more detailed diagram of a third embodiment of the hysteresis stage and threshold stages of FIG. 7.

In the hysteresis stage shown in FIG. 10, the width of the hysteresis region can be changed. For this embodiment operational amplifier 93 has a positive feedback resistor 94 which is divided into two parts 941 and 942. The common point between resistors 941 and 942 is connected through a resistor 138 to the main conducting circuit of a semiconductor switch 139. The control electrode of switch 139 is connected to terminal 140. Operational amplifier as described above receives voltages corresponding to the engaged gear, the gear speed $n_G$ and the throttle valve position as long as a signal is present at control electrode 140 which causes switch 139 to be non-conductive, the operation of the circuit of FIG. 10 will be that shown in FIGS. 8 and 9. If however a control voltage is applied at terminal 140 which causes the switch to become conductive the center tap of resistor 94 will be connected to reference potential through resistor 138. Thus the positive feedback of operational amplifier 93 is changed which causes a change in the width of the hysteresis curve. Thus applying a control voltage to terminal 140 allows a control of the width of the switching hysteresis of stage 46. In a preferred embodiment switch 139 is a field effect transistor and terminal 140 is connected to the throttle valve position sensor 36 and to contacts 44.

Figure 11:
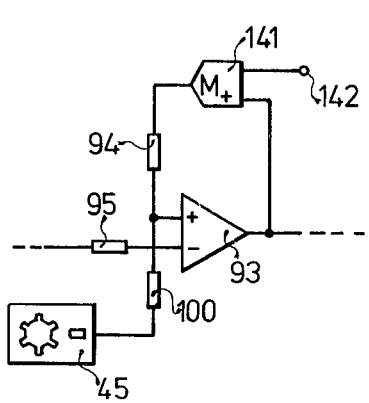
FIG. 11 is a fourth embodiment of the hysteresis stage and threshold stages of FIG. 7.

A further embodiment of hysteresis stage 46 is shown in FIG. 11. First operational amplifier 93 has a positive feedback including the series circuit of a multiplier stage 141 and resistor 94. The first input of multiplier stage 141 is connected to the output of operational amplifier 93 while its output is connected through resistor 94 to the direct input of operational amplifier 93. The second input of multiplier stage 140 is connected to a terminal 142. By controlling the voltage applied to terminal 142, the current flowing through resistor 94 can be adjusted on a continous basis. This changes the positive feedback and therefore the width of the hysteresis curve. As mentioned in the description relative to FIG. 10, in a particularly preferred embodiment terminal 142 is connected to throttle position sensor 36 and contacts 44.

Figure 12:
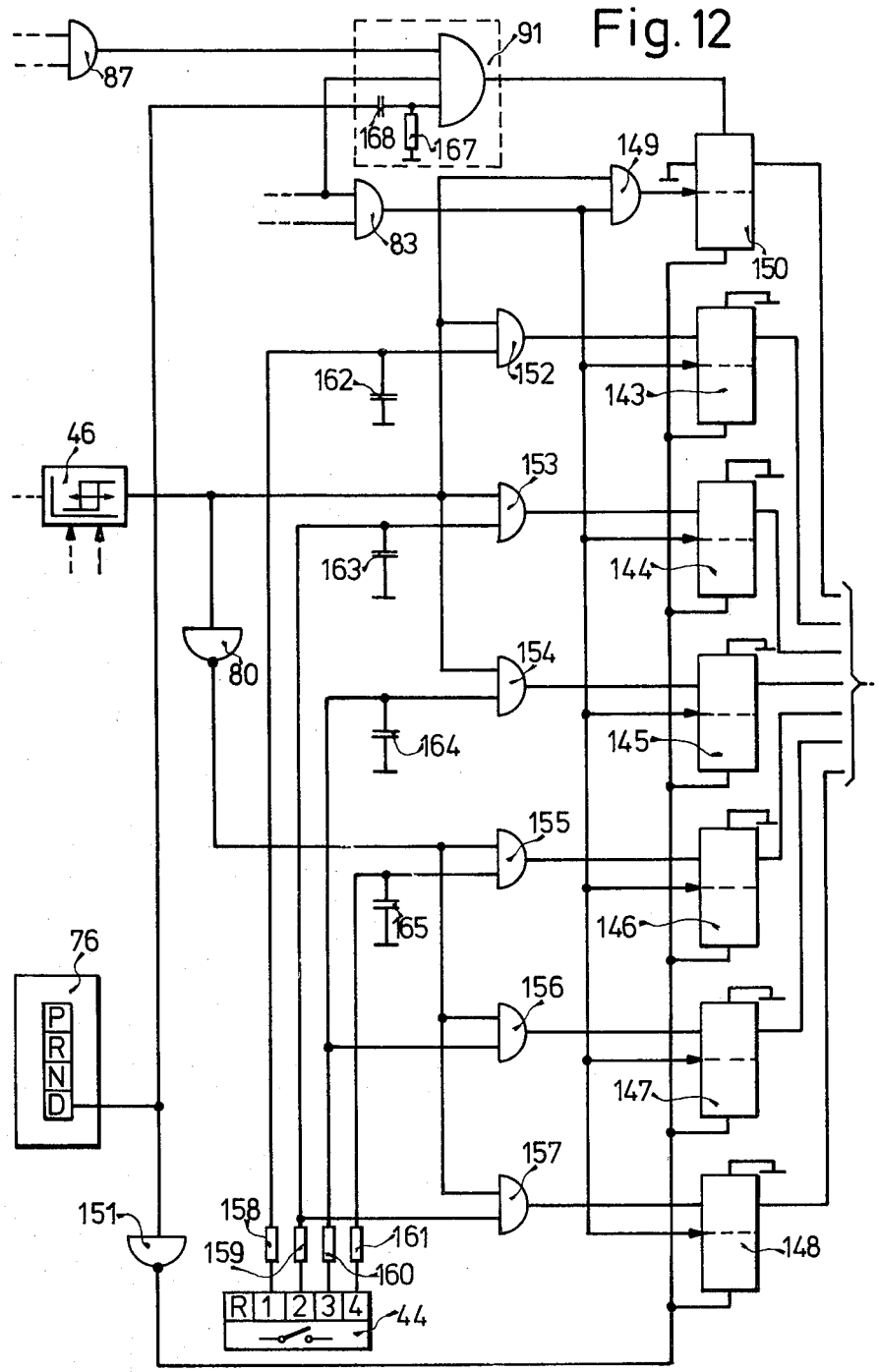
FIG. 12 is a diagram of a preferred embodiment of the gear control means shown in FIG. 7.

FIG. 12 shows a preferred embodiment of the gear control stage 41 of FIG. 7. The output of third AND gate 83 is connected to the common clock input of a third flip-flop 143, a fourth flip-flop 144, a fifth flip-flop 145, a sixth flip-flop 146, a seventh flip-flop 147, an eighth flip-flop 148 and, through a ninth AND gate 149, to the clock input of a ninth flip-flop 150. The outputs of flip-flops 143, 144, 145, 146, 147, 148 and 150 are connected to the inputs of stage 42, that is the servo stage controlling the gear ratios. Flip-flops 143-148 have override set inputs which are connected to reference potential. The override reset inputs of these flip-flops, together with the override reset input of flip-flop 150, are connected through a third inverter 151 to the D position of the driver operated mode selector 76. The set input of third flip-flop 143 is connected to the output of a tenth AND gate 152, the set input of flip-flop 144 to the output of an eleventh AND gate 153, the set input of flip-flop 145 to the output of a twelfth AND gate 154, the set input of flip-flop 146 to the output of a thirteenth AND gate 155, the set input of flip-flop 147 to the output of a fourteenth AND gate 156 and the set input of flip-flop 148 is connected to the output of a fifteenth AND gate 157. AND gates 152, 153, and 154 each have an input connected to hysteresis stage 46. The output of hysteresis stage 46 is connected through an inverter 80 to one input each of AND gates 155, 156 and 157. The second input of AND gate 152 is connected through a resistor 158 to the contact signifying first gear of engaged gear contacts 44. The second input of AND gate 153 together with the second AND gate 157 is connected through a resistor 159 to the contact signifying second gear, the second input of AND gate 154 together with the second input of AND gate 156 are connected through a resistor 160 to the contact signifying an engaged third gear. The second input of AND gate 155 is connected through a resistor 161 to the contact signifying an engaged fourth gear. The second inputs of AND gates 152, 153, 154 and 155 are also connected, respectively, through capacitors 162, 163, 164 and 165 to reference potential. The clock input of flip-flop 150 is controlled by the output of a ninth AND gate 149 whose first input is connected to the output of hysteresis stage 46 and whose second input is connected to the common clock line of flip-flops 143–148. The set input of flip-flop 150 is connected to reference potential, while the override set input is connected to the output of AND gate 91. The second input of AND gate 91 is connected to the output of a differentiating circuit comprising a resistor 167 and a capacitor 168. The input of the differentiator circuit is connected to the D output of the mode selector 76.

An output from flip-flop 150 causes an up-shift from idle into first gear, an output from flip-flop 143 an upshift from first to second gear, from flip-flop 144 an up-shift from second to third gear, an output from flip-flop 145 an up-shift from third to fourth gear, an output from flip-flop 146 a down-shift from fourth to third gear, an output from flip-flop 147 a down-shift from third into second, and an output from flip-flop 148 a down-shift from second into first gear. It will be noted that terminal 410 is the output of AND gate 83 and is thus connected to the common clock inputs of flip-flops 143–148. The desired shift signal furnished at terminal 410 cannot, however, reach the clock input of flip-flop 150 unless a signal also appears at the second input of AND gate 149.

It should be noted again here that the output of AND gate 83 only furnishes a "1" signal when the gas pedal is activated rapidly while the clutch is disengaged or if an automatic down-shift is to occur if the gear speed is less than the first predetermined threshold speed 17, 18, 19, 29 and the gas pedal is in the released state.

Input 411 of stage 41 is the second input, while input 412 is the first input of AND gates 152–157. Logic "1" signals at the output of hysteresis stage 46 which constitute up-shift enable signals are applied to AND gate 149, 152, 153 and 154; the logic "0" signals at the output of hysteresis stage 46 are inverted by inverter 80 and applied to AND gates 155, 156, 157. If a up-shift enable signal coincides with a then-present gear as signified by one of the contacts 44, the corresponding AND gate furnishes an output, that is a "1" signal. If, for example, third gear is engaged and hysteresis stage 46 furnishes a positive signal, both inputs of AND gate 154 receive a "1" signal so that the set input of flip-flop 145 receives a positive signal. If a desired shift signal is now applied to the clock inputs, flip-flop 145 will be set and furnish the specific gear signal, that is the command to shift from third into fourth gear, to stage 42.

The clock input of flip-flop 150 is only energized when a positive signal appears at the output of hysteresis stage 46 and, at the same time, a positive signal is applied to the common clock line. The set input of flip-flop 150, whose output controls the shifting from neutral into first gear, is connected to the output of AND gate 91. This means that a shift into first gear can only occur when AND gate 87 furnishes an output signal when the gas pedal is released and the gear speed is very low, when the clutch 49 is disengaged, and the driver has moved the mode selector lever from neutral to drive. The second inputs of AND gate 152-157 are connected to contacts 44 through RC circuits thereby causing a slight relative advance in time between the application of the set pulses to the corresponding flip-flops and the application of the clock pulses. This allows trouble free operation. The D output of mode selector 76 is connected through inverter 151 to the override reset inputs of flip-flops 150, 143-148. This suppresses all flip-flop outputs when the mode selector is either in the neutral, the reverse, or the park position.

The invention is not to be limited to the embodiments shown in the drawings. Various changes and modifications may be made within the scope of the inventive concept.

We claim:

1. In an automotive vehicle having a gas pedal (34), an engine having a throttle valve (35) coupled to said gas pedal, gearing (43), gear speed sensor means (45) for furnishing a transmission speed signal indicative of the speed of said gearing, and gear shift means (42) for changing gear ratios in said gearing in response to shift command signals, a system for furnishing said shift command signals to said gear shift means, comprising, means (36-39) connected to said gas pedal for furnishing a desired gear shift signal only when the magnitude of rate of change of position of said gas pedal exceeds a predetermined magnitude;

shift enable signal furnishing means (46, 80) connected to said gear speed sensor means, for furnishing an up-shift enable signal when the speed of said gearing exceeds a predetermined first gear speed and for furnishing a down-shift enable signal when the speed of said gearing is less than a predetermined second gear speed;

and gear control means (41) connected to said desired gear shift signal furnishing means and said shift enable signal furnishing means, for furnishing an up-shift command signal to said gear shift means in response to the simultaneous presence of said desired gear shift signal and said up-shift enable signal, and for furnishing a down-shift command signal to said gear shift means in response to the simultaneous presence of said desired gear shift signal and said down-shift enable signal.

2. A system as set forth in claim 1, wherein said desired gearshift signal furnishing means further comprises throttle position sensor means (36) connected to said throttle valve for furnishing a throttle position signal corresponding to the position of said throttle relative to a closed throttle position, differentiator circuit means (37) connected to said throttle position signal furnishing means for differentiating said throttle position signal and furnishing a differentiated throttle position signal, means (38) connected to said differentiator circuit means for furnishing a magnitude signal corresponding to the magnitude of said differentiated throttle position signal, and comparator means (39) for comparing said magnitude signal to a first reference signal and furnishing said desired gear shift signal only if said magnitude signal exceeds said first reference signal.

3. A system as set forth in claim 2, further comprising present gear signal furnishing means (44) for furnishing a plurality of present gear signals, each indicative of the then engaged gear, and means for applying said present gear signal to said gear control means;

and wherein said gear control means comprises logic means (152-157) for combining said present gear signals with said up-shift or down-shift command signal if present and creating a specific shift signal in response to the so combined signals, and applying said specific shift signals to said gear shift means.

4. A system as set forth in claim 3, further comprising coupling means (49) for coupling said engine (47, 48) to said gearing (50, 43);

coupling activator means (54) for engaging and disengaging said coupling means under control of coupling control signals;

engine speed sensor means (53) coupled to said engine for furnishing an engine speed signal indicative of the speed thereof;

coupling position sensor means (55) connected to said coupling means for furnishing a coupling position signal indicative of the position thereof;

coupling control means (56) responsive to said throttle position signal, said engine speed signal, said coupling position signal, said transmission speed signal, and said present gear signals for furnishing said coupling control signals to said coupling activator means;

and first switch means (57) interconnected between said coupling control means and said coupling activator means, for connecting said coupling control means to said coupling activator means in response to said desired shift signal thereby initiating a shift and for disconnecting said coupling control means from said coupling activator means upon completion of the so-initiated shift.

5. A system as set forth in claim 4, wherein said coupling control means comprises jolt control means (59) for limiting the maximum jolt during gear shift to a maximum allowable jolt.

6. A system as set forth in claim 5, wherein said gearing comprises means for furnishing gear ratios constituting a first, second, third and fourth gear;

wherein said gear control means comprises a plurality of flip-flops (143-148, 150) each for furnishing a specific gear signal to said gear shift means when set, said plurality of flip-flops comprising upshift flip-flops (150, 143-145) associated, respectively with the idle gear and the first, second, and third gears, each for furnishing a signal indicative of a shift command from said associated gear to the next higher gear when set, and a plurality of downshift flip-flops (145-148) associated, respectively, with said fourth, third and second gears, each for furnishing a signal constituting a down-shift command from the associated one of said gears to the next lower gear;

wherein each of said flip-flops further has a clock input;

and wherein said gear control means further comprises means for applying said desired gear shift signal to said clock inputs of said plurality of flip-flops.

7. A system as set forth in claim 6, wherein each of said flip-flops further has a set input, a reset input, and an override reset input;

further comprising a plurality of AND gate means (152-157) each having an AND gate output connected to said set input of a corresponding one of said flip-flops, each having a first input connected to receive one of said engaged gear signals, each of said AND gate means associated with one of said first plurality of flip-flop means having ansecond input connected to receive said shift-up signal, each of said AND gates having an AND gate output connected to said set input of one of said second plurality of flip-flop means having a second input for receiving said shift-down signal.

8. A system as set forth in claim 7, wherein said motor vehicle further comprises a driver operated mode selector having a park, reverse, neutral and drive position;
further comprising means for suppressing all of said gear shift command signals when said driver operated mode selector is not in said drive gear.

9. A system as set forth in claim 8, further comprising means for furnishing a drive signal when said driver operated mode selector is in said drive position, and differentiating circuit means (167, 168) connected to said drive signal furnishing means for furnishing a differentiated drive signal;
wherein said plurality of flip-flops comprises a first flip-flop for furnishing a gear shift command signal for shifting from said neutral to said first gear when set, said first flip-flop having an override set input;
further comprising means (91) for applying said differentiated drive signal to said override set input of said first flip-flop means, whereby said gearing is switched to said first gear when said driver operated gear shift means is switched from neutral to drive.

10. A system as set forth in claim 5, further comprising second switch means (67) connected between said first switch means and said jolt control means for connecting said jolt control means to said first switch means under control of a second switch control signal, and first flip-flop means (68) for furnishing said second switch control signal to said second switch means, said first flip-flop means having a set input responsive to the joint presence of a coupling means position signal indicative of a completely disengaged coupling and one of said present gear signals, and a reset input responsive to a coupling position signal indicative of a completely engaged coupling means.

11. A system as set forth in claim 5, wherein said coupling position sensor means furnishes a coupling disengaged signal when said coupling means is disengaged;
wherein said comparator means furnishes a first comparator output signal when said magnitude signal exceeds said first reference signal;
further comprising flip-flop means (85) having a set input connected to said comparator means, a reset input connected to said present gear signal furnishing means, and a flip-flop output, and third AND gate means (83) having a first input connected to receive said coupling disengaged signal and a second input connected to said flip-flop output, for furnishing said desired shift signal in the simultaneous presence of signals at said first and second inputs.

12. A system as set forth in claim 11, wherein said coupling control means comprises means to disengage said coupling means in response to a disengage command signal applied at a disengaged input (554);
further comprising means (71) for connecting said flip-flop output to said disengage input of said coupling control means.

13. A system as set forth in claim 12, wherein said means connecting said disengage input of said coupling control means to said flip-flop output comprises a second OR gate having a first input connected to said flip-flop output, a second input and a third input;
further comprising second threshold means (88) connected to said gear speed sensor means, for furnishing a second threshold output signal when said transmission speed signal is indicative of a transmission speed less than a predetermined first threshold speed, third threshold means (89) connected to said throttle position sensor means for furnishing a third threshold output signal when said throttle position signal is indicative of a released gas pedal, first AND gate means (87) connected to said second and third threshold means for furnishing a fifth AND gate output signal under simultaneous presence of said second and third threshold output signal, first OR gate means (69) having a first and second input respectively connected to receive engaged gear signals signifying an engaged first and reverse gear, and a first OR gate output, and first AND gate means (72) having a first input connected to said fifth AND gate output, a second input connected to said first OR gate output, and a first AND gate output connected to said second input of said second OR gate means.

14. A system as set forth in claim 13, further comprising speed limiter means (47) for limiting the speed of said engine in response to a speed control signal;
and means (92) for furnishing said speed control signal in the presence of said second flip-flop output signal and the absence of said third threshold signal.

15. A system as set forth in claim 13, further comprising driver operated free run switch means (74) for furnishing a free run signal when activated, and means (73) for energizing said third input of said second OR gate means in the simultaneous presence of a throttle position signal indicative of a released gas pedal and said free run signal.

16. A system as set forth in claim 4, further comprising hysteresis means (46) connected to said gear speed sensor means and having a hysteresis output, for switching from a first to a second hysteresis output signal at a predetermined first gear speed for increasing gear speeds, and for switching from said second to said first hysteresis output signal at a predetermined second gear speed less than said first gear speed for decreasing gear speed, and means for connecting said hysteresis output to said gear control means.

17. A system as set forth in claim 16, wherein said hysteresis means further has a first and second control input and comprises means for changing said predetermined first and second gear speed as a function of signals applied at said first and second control inputs;
further comprising means for connecting said throttle position signal to said first control input and said present gear signal furnishing means to said second control input of said hysteresis means.

18. A system as set forth in claim 17, wherein said hysteresis means (46) comprises first operational amplifier means (93) having a direct input, an inverting input and a first operational amplifier output;
and wherein said means for connecting said throttle position signal to said first control input comprises second operational amplifier means (96) having an inverting input connected to said throttle position sensor means, a direct input, and a second operational output, negative feedback means (97) connected from said second operational amplifier output to said inverting input, and means (98, 99) for furnishing a reference signal to said direct input, summing means (126) connected to said second operational output and said present gear signal furnishing means for furnishing a summing output signal corresponding to the sum of signals applied thereto, and means (95) for applying said summing output signal to said first operational amplifier means.

19. A system as set forth in claim 18, wherein said summing means comprises third operational amplifier means having an inverting input connected to said second operational amplifier output and said present gear signal furnishing means and a direct input for receiving a reference signal, and inverter means connected to the output of said third operational amplifier means.

20. A system as set forth in claim 19, wherein said hysteresis means has a hysteresis range extending from a predetermined second gear speed to a predetermined first gear speed higher than said predetermined second gear speed;
further comprising means for changing the width of said range as a function of said engaged gear signals.

21. A system as set forth in claim 20, wherein said means for changing the width of said range comprises feedback means including a first (941) and second (942) resistor and means (138, 139) for connecting a common point of said first and second resistor to a reference potential in response to selected ones of said engaged gear signals.

22. A system as set forth in claim 21, wherein said means for connecting said common point to a reference potential comprises a field effect transistor (139).

23. A system as set forth in claim 22, wherein said means for connecting said common point of said first and second resistor to reference potential under control of said engaged gear signals, comprises means for connecting said common point to said reference potential under control of selected ones of said engaged gear signals and under control of said transmission speed signal.

24. A system as set forth in claim 21, wherein said means for changing the width of said range comprises multiplier means (141) having a first input connected to said first operational amplifier output, a second input for receiving said engaged gear signals, and a multiplier output connected to said direct input of said first operational amplifier means.

25. A system as set forth in claim 24, wherein said second input of said multiplier means is also connected to said throttle position sensor means.

26. A system as set forth in claim 17, wherein said gear control means has a shift-up input (77) and a shift-down input (78) and wherein said means connecting said hysteresis output to said gear control means comprises means for connecting said hysteresis output directly to said shift up input, inverting means for furnishing an inverted hysteresis output signal, and means connecting said inverted hysteresis output signal to said shift down input of said gear control means.

27. A system as set forth in claim 26, further comprising first threshold means (81) for furnishing a first threshold output signal when said transmission speed signal is indicative of a gear speed exceeding a predetermined minimum up-shift speed (23, 21, 22, 33), and third switch means (79) interconnected between said hysteresis output and said shift up input of said control means, for connecting said hysteresis output to said shift up input only in response to said first threshold output signal.

28. A system as set forth in claim 27, wherein said hysteresis means comprises first operational amplifier means (93) having a direct input, an inverting input and a first operational amplifier output, positive feedback means (94) connected from said first operational amplifier output to said direct input, means (100) for connecting said direct input to the output of said transmission speed sensor means, means (101, 103) for connecting said direct output to said engaged gear signal furnishing means, and means (95-99, 102) for connecting said inverting input to said throttle position sensor means.

29. A system as set forth in claim 28, wherein said means connecting said inverting input to said throttle position sensor means comprises second operational amplifier means (96) having an inverting input connected to the output of said throttle position sensor means, a second operational amplifier output and a direct input, negative feedback means (97) connected from said second operational amplifier output to said inverting input, and potentiometer means (98) for furnishing an adjustable control signal to said direct input of said second operational amplifier means.

30. A system as set forth in claim 29, wherein said first threshold means comprises fourth comparator means (120) having a direct input, and inverting input and a fourth comparator output, means (121) for connecting said direct input to said transmission speed sensor means, means for furnishing an adjustable control signal (124, 123) and means (122), connecting said inverting input to said means for furnishing an adjustable control signal.

31. A system as set forth in claim 30, wherein said third switch means (79) comprises eighth AND gate means (125) having a first input connected to said fourth comparator output and a second input connected to said first operational amplifier output.

32. A system as set forth in claim 27, wherein said first threshold means has a first threshold control input for adjusting the threshold value thereof;
further comprising means connecting said threshold control input to said present gear signal furnishing means, whereby said threshold of said first threshold stage varies as a function of the then-present gear ratio.

33. A system as set forth in claim 4, further comprising automatic desired shift signal furnishing means (84-89) for furnishing said desired shift signal when the speed of said gearing is less than a predetermined first threshold speed and said pedal is released.

34. A system as set forth in claim 33, wherein said automatic desired shift signal furnishing means comprises second threshold means (88) for furnishing a second threshold output signal when said speed of said gearing is less than said first predetermined threshold speed, third threshold means (90) for furnishing a third threshold output signal when said pedal is released, and fifth AND gate means (87) for furnishing said automatic desired shift signal in the simultaneous presence of said second and third threshold output signals.

35. A system as set forth in claim 34, wherein said second threshold means (88) comprises second comparator means (104) having an inverting input, a direct input and a second comparator output, means (105) for connecting said inverting input of said second comparator means to said transmission speed sensor means, means (106, 108) for connecting said inverting input to said present gear signal furnishing means, means for furnishing an adjustable control signal (111), and means (110) for connecting said direct input of said second comparator means to said means for furnishing an adjustable control signal;

wherein said third threshold means (89) comprises third comparator means (113) having an inverting input, a direct input and a third comparator output, means (114,96) for connecting said inverting input to said throttle position sensor means, means for furnishing an adjustable control signal (116, 117), means (115) for connecting said direct input to said means for furnishing an adjustable control signal.

36. A system as set forth in claim 35, further comprising additional downshift control means (118, 119) connected between said fourth AND gage output and said third switch means, for furnishing a shift down control signal to said third switch means and thereby to said gear control means, in response to a fourth AND gate output signal.

37. A system as set forth in claim 34, further comprising means for suppressing said automatic desired shift signal in response to a selected one of said engaged gear signal signifying the first gear.

38. A system as set forth in claim 37, wherein said means for suppressing said automatic desired shift signal comprises fourth AND gate means (86) having an inverting output for receiving the present gear signal signifying first gear and a direct input connected to the output of said fifth AND gate means.

39. A system as set forth in claim 38, further comprising third AND gate means (83) having a first input connected to said coupling position sensor means for receiving a coupling disengaged signal, a second input connected to the output of said third OR gate means, and a third AND gate output connected to said gear control means, whereby said automatic desired shift signal is transmitted to said gear control means only when said coupling is disengaged.

40. A system as set forth in claim 39, wherein said motor vehicle has driver operated gear shift means having a park, reverse, neutral and drive position;

further comprising means for furnishing a "shift to first gear" signal when said driver operated gear shift means is shifted from neutral to drive in the simultaneous presence of said coupling disengaged signal and said automatic desired shift signal.

41. A system as set forth in claim 40, wherein said means for furnishing said "shift to first gear" signal comprises sixth AND gate means (91) having a differentiating input connected to said drive position of said driver operated gear shift means, a second input connected to receive said automatic desired shift signal, and a third input connected to receive said coupling disengaged signal, and a sixth AND gate output connected to said logic circuit means of said gear control means.

42. A system as set forth in claim 34, wherein said second threshold means comprises means for changing the threshold value in response to a threshold control signal, and means for furnishing said threshold control signal in dependence on said engaged gear signals.

43. A system as set forth in claim 42, wherein said third threshold means has externally operable means for changing the threshold value thereof.

44. In a motor vehicle having a gas pedal (34), a throttle valve (35) coupled to said pedal, gearing having a plurality of gear ratios, and gear shift means (42) for changing said gear ratios in response to gear shift command signals applied thereto, a method for furnishing said gear shift command signals to said gear shift means, comprising the steps of sensing the rotary speed of said gearing and furnishing a first transmission speed signal only when the rotary speed of said gearing exceeds a predetermined first gear speed and a second transmission speed signal only when the rotary speed of said gearing is less than a predetermined second gear speed;

substantially simultaneously sensing the rate of change of position of said throttle valve relative to a closed position and furnishing a first limiting derivative signal only when the rate of change of position of said throttle valve exceeds a first predetermined throttle valve position change value and furnishing a second limiting derivative signal only when the rate of change of said throttle valve position exceeds a second predetermined throttle valve position change value;

and furnishing an upshift command signal to said gear shift means only in response to the simultaneous presence of said first limiting derivative signal and said first transmission speed signal and furnishing a downshift command signal only in response to the joint presence of said second limiting derivative signal and said second transmission speed signal.

45. A method as set forth in claim 44, wherein said predetermined second gear speed is less than said predetermined first gear speed, gear speeds between said predetermined second and predetermined first gear speed constituting a predetermined gear speed range.

46. A method as set forth in claim 45, wherein said step of sensing said rate of change of position of said throttle valve relative to said closed position comprises sensing the position of said throttle valve relative to said closed position, furnishing a corresponding throttle position signal, and differentiating said throttle position signal with respect to time;

further comprising the step of varying said predetermined first and second gear speeds in response to said throttle position signal prior to said furnishing of said first and second transmission speed signals.

47. A method as set forth in claim 46, wherein said steps of varying said predetermined first and second gear speeds comprises varying said predetermined first and second gear speeds in such a manner that said predetermined gear speed range remains constant.

48. A method as set forth in claim 45, further comprising the step of furnishing a gear ratio signal corresponding to the then-present gear ratio, and varying said predetermined first and second gear speeds in response to said gear ratio signal prior to said furnishing of said first and second limiting derivative signals.

49. A method as set forth in claim 48, wherein said steps of varying said predetermined first and second gear speeds comprises a step of varying said predetermined first and second gear speeds as a function of the then-present gear ratio in such a manner that said predetermined gear speed range remains constant.

50. A method as set forth in claim 48, wherein said predetermined first throttle position valve is a fully closed position.

51. A method as set forth in claim 45, wherein said step of sensing said rotary speed of said gearing further comprises the step of furnishing a third transmission speed signal only when said gearing speed is less than a predetermined first threshold speed;
wherein said step of sensing said rate of change of position of said throttle valve relative to said closed position comprises the step of sensing said position of said throttle valve relative to said closed position and furnishing a predetermined first throttle position signal only when said position of said throttle valve is less than a predetermined first throttle valve position;
and wherein said step of furnishing a downshift command signal further comprises furnishing said downshift command signal to said gear shift means in the joint presence of said third transmission speed signal and said predetermined first throttle position signal.

52. A method as set forth in claim 45, further comprising the step of impeding said furnishing of said up-shift signal when said gearing speed is less than a predetermined minimum up-shift speed (20, 21, 22, 33).

* * * * *

UNITED STATES PATENT AND TRADEMARK OFFICE
CERTIFICATE OF CORRECTION

PATENT NO. : 4,226,295

DATED : 7 October 1980

INVENTOR(S) : Helmut REMBOLD et al

It is certified that error appears in the above-identified patent and that said Letters Patent are hereby corrected as shown below:

Change the title to read "GEAR SHIFT SYSTEM AND METHOD WITH OPTIONAL GAS PEDAL CONTROLLED SHIFT INITIATION"

Column 19, line 4, (claim 7, line 10) change "an second" to -- a second --

Signed and Sealed this

*Twenty-seventh* Day of *January 1981*

[SEAL]

*Attest:*

RENE D. TEGTMEYER

*Attesting Officer*     *Acting Commissioner of Patents and Trademarks*